United States Patent [19]
Farrar et al.

[11] Patent Number: 5,494,376
[45] Date of Patent: Feb. 27, 1996

[54] METHOD AND APPARATUS FOR CONTROLLING IN SITU WASTE REMEDIATION

[76] Inventors: Lawrence C. Farrar, 218 Roosevelt Dr., Butte, Mont. 59701; William J. Quapp, 860 W. Riverview Dr., Idaho Falls, Id. 83401

[21] Appl. No.: 283,354

[22] Filed: Aug. 1, 1994

[51] Int. Cl.$^6$ ........................................................ B09B 3/00
[52] U.S. Cl. ............................ 405/128; 405/131; 405/258; 588/253
[58] Field of Search ................................... 405/128, 129, 405/131, 229, 234, 258; 588/253

[56] References Cited

U.S. PATENT DOCUMENTS

| | | | |
|---|---|---|---|
| 5,181,795 | 1/1993 | Circeo et al. | 405/128 |
| 5,181,797 | 1/1993 | Circeo et al. | 405/131 |
| 5,276,253 | 1/1994 | Circeo et al. | 588/253 |

FOREIGN PATENT DOCUMENTS

| | | |
|---|---|---|
| 582363 | 11/1977 | U.S.S.R. |
| 914715 | 3/1982 | U.S.S.R. |
| 958590 | 9/1982 | U.S.S.R. |
| 977570 | 11/1982 | U.S.S.R. |

*Primary Examiner*—Dennis L. Taylor
*Attorney, Agent, or Firm*—Peter Tribulski

[57] ABSTRACT

An in situ waste treatment system for contaminated soil employs a high temperature energy probe which is lowered into a borehole casing that has been inserted into the contaminated soil. The energy probe is activated and then melts surrounding region of the contaminated soil. The probe is raised and continues to melt a cylindrical column of soil that surrounds the borehole casing. Oxygen is introduced into the molten material so that organic and metallic components thereof are oxidized. In basaltic soils superheating and nucleation materials are introduced to enhance formation of a crystalline structure in the contaminated soil as it solidifies. Increased crystallinity makes the resultant solidified basaltic materials more resistant to leaching by ground water. Other types of contaminated soils are treated with waste modifiers to produce optimum leach resistance of the resultant resolidified soil.

19 Claims, 2 Drawing Sheets

METHOD AND APPARATUS FOR CONTROLLING IN SITU WASTE REMEDIATION

FIELD OF THE INVENTION

The invention relates to treatment of in ground waste by stabilizing or destroying undesirable components of the waste and preventing leaching or other migration of the components.

BACKGROUND OF THE INVENTION

Throughout the industrialized world various by-products of manufacturing and other industrial operations have been disposed of by being buried in the earth. Often these buried wastes are sources of air and ground water contamination and pose significant public safety and health risks. In many cases these waste products contain heavy metal compounds which can dissolve in and be carried by ground water. In some instances the waste products contain organic compounds which contaminate ground water. And in some instances the waste products have residual radioactivity. Each of these public safety and health concerns have varying degrees of seriousness depending on the location and composition of the soil in which the wastes are buried.

In some instances, conventional land fill management techniques can be employed to adequately mitigate risks to public health and safety. Simple clay liners and monitoring wells are adequate for many land fills in the world. There are some instances, however, in which health risks are not sufficiently mitigated with conventional land-fill management techniques. There are also instances where wastes have been buried or otherwise disposed of in locations which are not managed as landfills. In these instances and where waste components are particularly toxic, it has been found necessary to remove the waste material and surrounding contaminated soils and move these materials to a remote treatment facility. Obviously, this is a very expensive and cumbersome practice.

In order to reduce the cost of treating soils which are contaminated with highly toxic wastes, various techniques have been devised for in situ treatment of the soil to alter its characteristics and make it less dangerous. One such technique involves heating contaminated soil and other co-mingled buried waste to drive out most organic components as off-gasses. These gasses are collected and incinerated or otherwise treated to mitigate their adverse characteristics. In some instances, the contaminated soil is heated to a high enough temperature to cause melting of the soil. The molten soil and the waste contained therein are then allowed to resolidify into a glassy substance that is more resistant to ground water leaching. Examples of such processes are described in U.S. Pat. No. 5,181,795 (Circeo, Jr. et al.), issued Jan. 26, 1993 and U.S. Pat. No. 4,776,409 (Manchak, Jr. et al.), issued Oct. 11, 1988.

These techniques are suitable for some moderately risky waste deposits. There remains, however, a collection of waste deposits that have been untreatable with any of the techniques that have been heretofore devised.

In some instances the toxic contaminants have migrated to great depths in the earth, in the order of hundreds of feet. Some prior art processes, such as those described in U.S. Pat. No. 4,376,598 (Breans et al.), issued Mar. 15, 1983, initiate melting near the surface of the contaminated soil are not usable to treat contaminated soils at such great depths.

In other instances, the contaminated soil and other buried wastes are composed of materials which, when vitrified, form a substance which is not sufficiently leach resistant. This is particularly significant where the soil contaminants are heavy metals or radioactive substances.

It is desirable therefore to provide a system that will provide for cost effective treatment of waste materials buried in soil of varying composition which will produce a highly leach resistant amalgam of the waste material and the surrounding soil.

It is also desirable to provide a system that is capable of treatment of contaminants which are buried or have migrated to great depths, in the order of hundreds of feet.

Additionally, it is desirable to provide a system that will treat contaminants, particularly radioactive contaminants, without a need to bring any of the contaminants to exposure above ground.

SUMMARY OF THE INVENTION

The present invention is directed to a system for in situ treatment of contaminated soil. The contaminated soil is melted with an energy probe that is inserted into the soil. Oxygen rich materials are introduced into a cavity produced by melting the soil. Substantially all organic and metallic components of the soil are oxidized. When the soil resolidifies, its components are highly resistant to ground water leaching.

Viewed from one aspect, the invention is directed to an apparatus for in situ treatment of waste materials in contaminated soil. The apparatus comprises a movable energy probe capable of melting the waste material, means for introducing the energy probe into the contaminated soil to a predetermined depth, means for activating the energy probe after the probe is inserted to the predetermined depth, means for introducing oxygen rich substances into the contaminated soil in a region that is substantially adjacent the activated energy probe and means for maintaining the energy probe at a predetermined location for a period of time sufficient to permit the adjacent contaminated soil to become molten and for substantially all of the organic and metallic components of the contaminated soil to become substantially oxidized.

Viewed from another aspect the present invention is directed to a method for in situ treatment of waste materials in contaminated soil. The method comprises the steps of introducing an energy probe into the contaminated soil to a predetermined depth, activating the energy probe after the probe is inserted to the predetermined depth, introducing oxygen rich substances into the contaminated soil in a region that is substantially adjacent the activated energy probe, and maintaining the energy probe at a predetermined location for a period of time sufficient to permit the adjacent contaminated soil to become molten and for substantially all of the organic and metallic components of the contaminated soil to become substantially oxidized.

The invention will be better understood from the following detailed description taken in consideration with the accompanying drawings and claims.

The drawings are not necessarily to scale.

DETAILED DESCRIPTION

Figure 1:
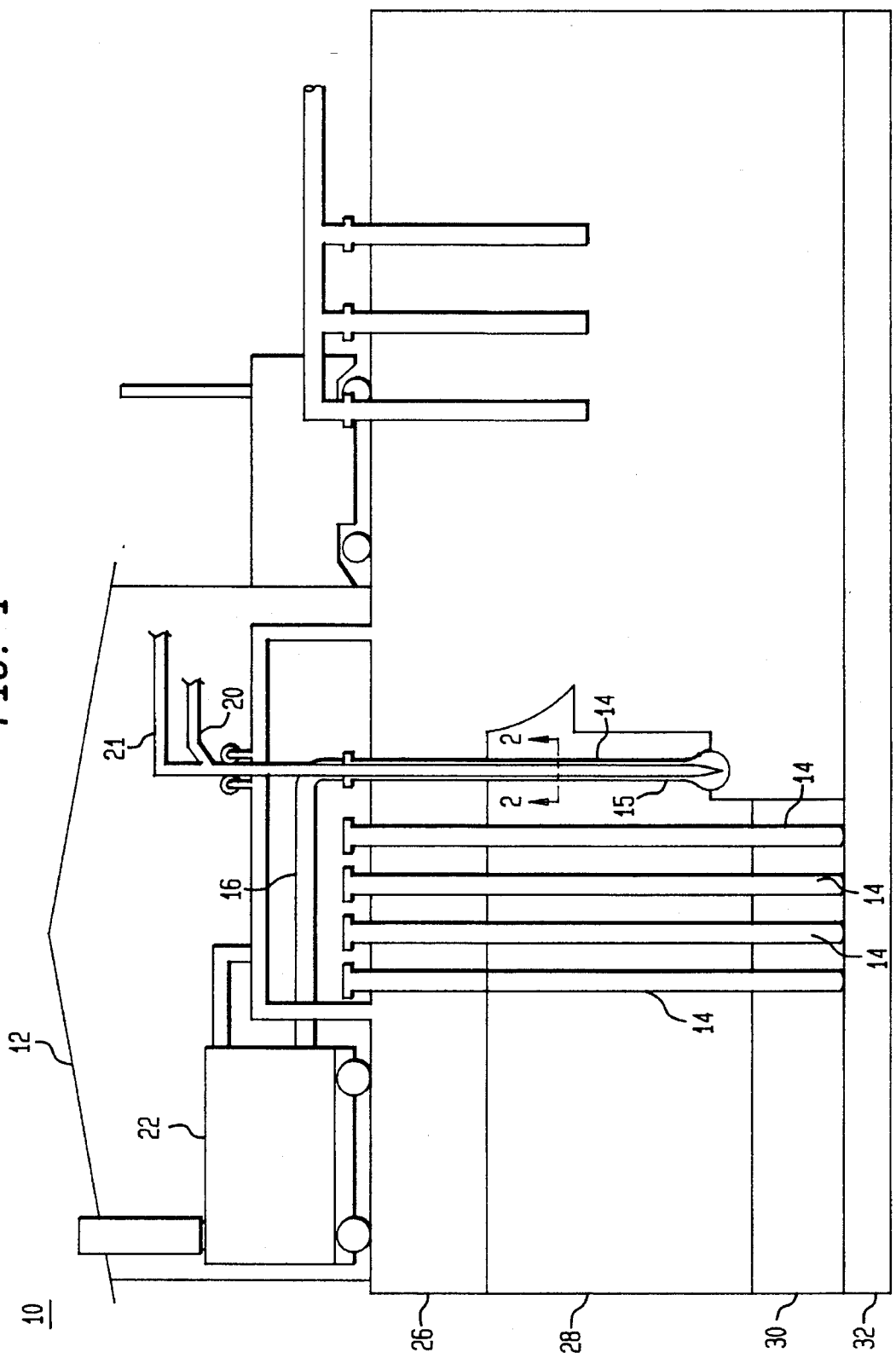
FIG. 1 shows, symbolically, an apparatus for in situ treatment of contaminated soil in accordance with the present invention.

Referring now to FIG. 1, there is shown an in situ waste treatment apparatus 10 which is an embodiment of the present invention. The waste treatment apparatus 10 comprises a portable structure 12, a series of bore casings 14, an off-gas collector 16, an energy probe 18, additives ports 20 and 21, an off-gas treatment unit 22 and a probe positioner 24. As shown in FIG. 1, the borehole casings 14 are inserted through a layer of overburden soil 26, through a layer of contaminated soil 28 and into a layer of underburden soil 30. In a typical employment of the inventive waste treatment apparatus 10, the borehole casings 14 do not penetrate into underlying rock layers 32. In some instances, the invention is employed at waste sites which do not have an uncontaminated soil overburden or underburden or an underlying rock layer.

In operation, the energy probe 18 is lowered into the into one of the borehole casings 14 using the probe positioner 24. After the probe 18 has reached the bottom of the borehole casing 14, the probe is energized with a conventional power source, not shown. The probe 18 generates enough heat to melt a surrounding region of the contaminated soil 28. Typically, the contaminated soil 28 is heated to temperatures in excess of 1200 degrees Celsius.

It should be noted that the borehole casings 14 can be inserted into the contaminated soil 28 without exhuming any of the soil. The borehole casings are inserted into the contaminated soil using a ResonatSonic technique developed by Water Development Corporation of Woodland, Calif. or some other equivalent conventional technique.

Figure 2:
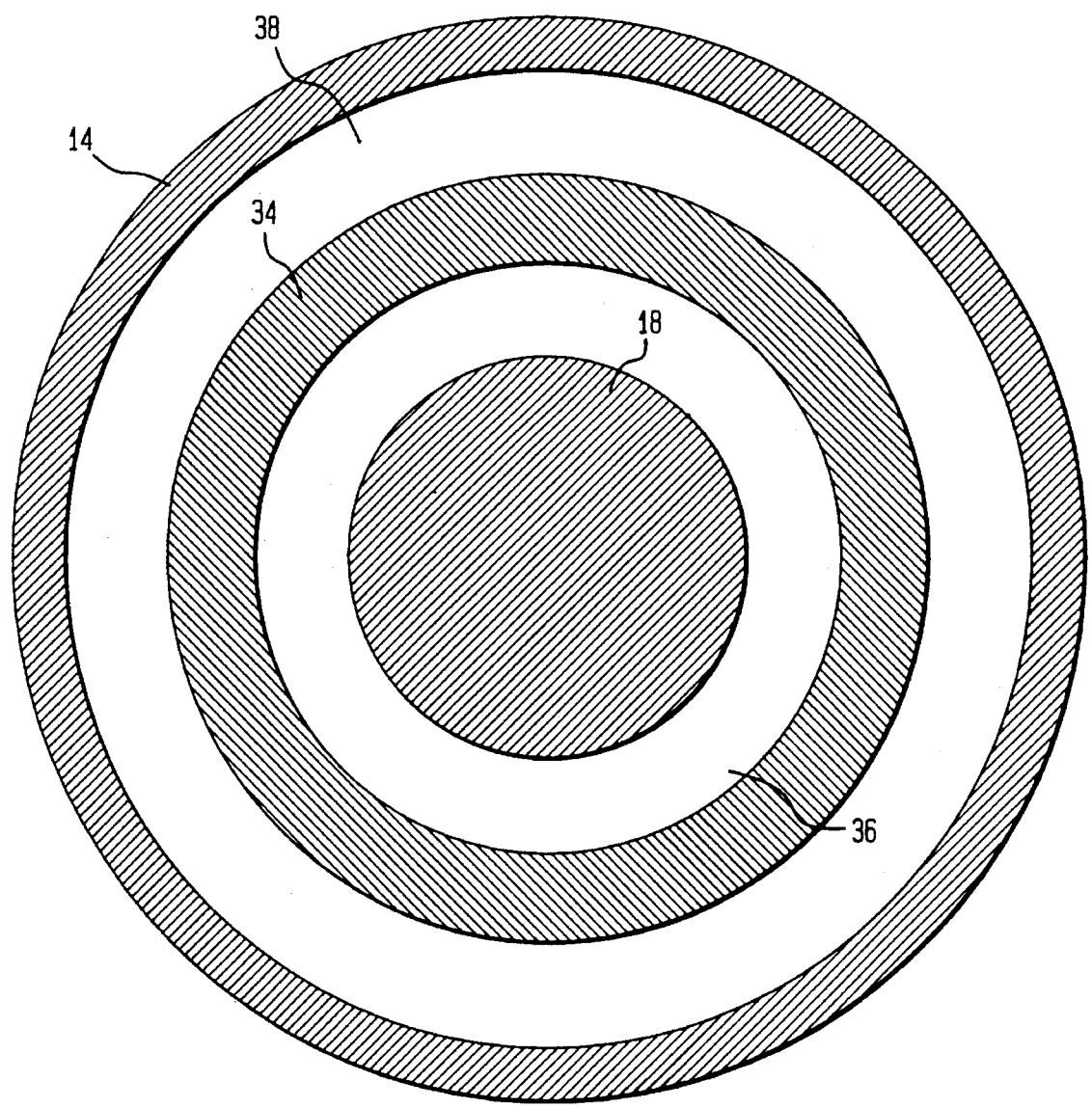
FIG. 2 shows a sectional view of a portion of the apparatus of FIG. 1 taken along the lines 2—2.

Referring now to FIG. 2 there is shown a sectional view through one of the borehole casings 14 in which the energy probe is inserted. The sectional view is taken along the lines 2—2 of FIG. 1.

In the embodiment shown in FIG. 2, the energy probe 18 is a concentric carbon arc melter available from Electro-Prolysis, Inc., Wayne, Pa. The apparatus 10 will also perform properly when the energy probe 18 comprises an induction plasma torch, a DC plasma torch, a high enthalpy fossil fueled torch or a reactive metal torch fueled with materials such as iron, magnesium or aluminum burned with oxygen. The energy probe 18 is inserted within a downcomer 34. The borehole casing 14 has an interior diameter of about twelve inches, the downcomer 34 has an external diameter of about eleven inches and the concentric arc melter energy probe 18 has an external diameter of about 10 inches. This results in first and second annular passageways 36 and 38 extending the entire length of the borehole casing 14 when the energy probe 18 is in place.

During heating of the contaminated soil 28, oxygen rich materials are introduced into the additives port 20. In some instances, waste form modifiers are introduced into the additive port 21 as will be discussed later hereinbelow. The additives port 20 and 21 and the energy probe 18 are interconnected so that the oxygen rich material reaches the region in which the contaminated soil 28 is heated. The oxygen rich material and other waste form modifiers are introduced through the first annular passageway 36 and off gases are vented through the second annular passageway 38.

In another embodiment (not shown), a passageway for addition of oxygen-rich materials and any desired waste form modifiers is developed in a separate pipe inserted parallel and adjacent to the borehole casing 14.

As heating progresses, the bottom of the borehole casing 14 melts and oxygen is made available to produce substantially complete oxidation of any materials which are contained in the contaminated soil 28 in the region near the probe 18. The probe 18 is held in position at the bottom of the borehole casing 14 long enough to permit the surrounding contaminated soil 28 to become molten.

After the contaminated soil at the bottom of the borehole casing is melted, the energy probe is slowly withdrawn upwardly along the axis of the borehole casing 14. The borehole casing 14 is progressively consumed and a long cylindrical column of molten soil 28 forms along the axis of the borehole casing 14. We have found that a large area of the contaminated soil 28 can be treated when a number of the borehole casings 14 are placed around the area. The borehole casings are placed close enough together so that melting of the contaminated soil along each of the borehole casings 14 produces an overlapped cylindrical region with the adjacent borehole casing 14. In this manner a virtually unlimited area of contaminated soil 28 can be treated.

When large areas of soil are to be treated, the melting can be performed by operating more than one of the energy probes 18 simultaneously in adjacent borehole casings. It has been found that the overall energy requirements are reduced when more than one energy probe 18 is operated at the same time.

It should be noted that the present invention can be practised at soil depths that are virtually unlimited. The borehole casings 14 are introduced in lengths that can extend hundreds of feet into the earth. The energy probe 18 can effectively heat the contaminated soil 28 at any depth that the bottom of the borehole casing 14 can reach. Thus, the present invention can be used to remediate situations where a contaminant has leached to depths hundreds of feet below grade level. Prior art treatment systems have been incapable of melting contaminated soil at any depth greater than about 17 to 20 feet.

It is another feature of this invention that the treatment zone need not be the entire depth of the contaminated soil 28. It is possible to form a layer of melted and re-solidified soil beneath or along the bottom of a particular zone of the contaminated soil 28. Such a layer can produce a highly effective barrier against further leaching of contaminants from the soil.

It has been found that introduction of oxygen rich material provides for a substantially complete oxidation of any organic components of the contaminated soil 28. Some of the resultant products of combustion of organic components are gases. These gasses are collected in the gas collector 16 and treated in the conventional gas treatment unit 22.

Additionally, it has been found that introduction of oxygen rich materials provides for a substantially complete conversion of any metallic components of the contaminated soil 28 into oxides of the metal. This is a particularly useful for soils which are contaminated with heavy metals and other materials which are regulated under the Resource Conservation and Recovery Act (RCRA). The oxides of these metallic contaminants dissolve readily in the molten soil mixtures.

In the prior art, when soils containing metals or metal compounds are melted, without introducing oxygen, there is an opportunity for the metals to concentrate at the bottom of the molten mass in their metallic or reduced form. This is because the metals are chemically reduced with the presence of organic carbons. The reduced metals are the most dense components of the melt and thus concentrate by effectively sinking in the molten mass. When such a molten mass is allowed to solidify, the concentrated metals are readily accessible to any ground water which may be present. The ground water leaches the metals and causes migration and more widespread contamination. Ironically, the results of prior art attempts to stabilize contaminated soil by conventional vitrification techniques may in some cases exacerbate the contamination problem.

When the present invention is employed to treat contaminated soil, any metals are substantially oxidized through the introduction of oxygen rich materials while the contaminated soil 28 is molten. The resultant oxides of the metals produce a more stable waste form. The metal oxides themselves are highly impervious to being dissolved by groundwater.

Additionally, in basaltic soils, the metallic oxides promote crystal growth as the molten mass of contaminated soil solidifies. The promotion of crystal growth occurs through various mechanisms, for example, the oxides provide nucleation sites for crystal growth. It is well-known that when molten basaltic soils are solidified, the degree of crystallinity of the solidified form has a direct effect on the ground water solubility of the solidified material. In other words, if a molten mass of basaltic soil is allowed to solidify into a glassy, non-crystalline form, there is a greater risk that its components will be leached away in ground water. Increasing crystallinity of the solidified mass reduces the leachability of its components.

Introduction of oxygen rich materials into the molten contaminated basaltic soil 28 directly improves the leach resistance of the resultant solidified mass.

It has been found that additional additives are useful in practicing the present invention. Certain particulates, when introduced into a molten mass of basaltic contaminated soil have been found useful in providing nucleation sites that enhance crystal development during cooling and solidification. Titanium and zirconium oxides are examples of materials which are useful in this regard.

Introduction of oxygen rich iron oxides have an advantage in contaminated basaltic soils. The iron oxides produce a resultant solid known as iron enriched basalt or IEB. IEB is well known as a highly leach resistant substance. Indeed IEB is considered to sufficiently leach resistant as to be suitable for containment of certain forms of radioactive wastes which must resist leaching for thousands of years.

Additionally, we have found that by also adding oxides of zirconium and oxides of titanium we can produce a particularly stable form of iron-enriched basalt known as IEB IV.

When the contaminated soil 28 contains fissionable radionuclides, compounds having a large neutron adsorption cross-section, such as boron compounds, are introduced into the additive port 20 during treatment. This reduces the probability of a sustained nuclear reaction from spontaneous radioactive decay and release of neutrons.

In order to further enhance formation of a crystalline structure in the solidified mass of basaltic contaminated soil, it is useful to superheat the soil. In other words, the energy probe 18 is permitted to remain in the region of melted soil even after the soil has reached a completely molten state. This causes the temperature of the soil to rise well above its melting temperature. Effectively, this technique adds a surplus amount of energy to the soil which results in a very slow solidification of the soil from its molten state. Indeed, when large volumes are treated, i.e., 100 cubic feet or more, the contaminated soil does not return to a solid state until a week or more has elapsed. These long cooling times are conducive to crystal formation. The resultant mass of treated contaminated basaltic soil is extremely leach resistant when it is produced in a superheating mode of operation of the energy probe 18.

We have found that some non-basaltic soils solidify by default into glasses which are inherently more leach resistant than their crystallized counterparts. In these instances, the present invention is employed simply to produce soluble metallic oxides. No efforts are made to add modifiers to produce crystal nucleation sites.

In some other non-basaltic soils, the default configuration of re-solidified soil is not particularly leach resistant, nor is the leach resistance improved with additional crystallinity. In these cases, we have found it expedient to add waste form modifiers such as $SiO_2$, $Al_2O_3$, $Fe_2O_3$ and other well known lesser constituents of basalt to the molten soil 28. This converts the molten contaminated soil 28 to a basaltic form. When the modified soil is resolidified, a stable crystalline basaltic rock is created.

In one embodiment of the invention the oxygen rich material is conventional commercial low grade gaseous oxygen. This gas is typically about 80% oxygen by weight. It has been found that introducing atmospheric air into the additive port 20 is not particularly desirable. Atmospheric air contains substantial amounts of nitrogen. When nitrogen is introduced in substantial quantities, i.e., greater than about 20% by weight, the combustion off-gases contain oxides of nitrogen which are difficult and expensive to treat.

Another useful application of the present invention is sealing abandoned boreholes. In this application the energy probe 18 is introduced into the bore hole to a predetermined depth. The probe 18 is activated after it reaches the bottom of the borehole or some intermediate desired depth. The energy probe 18 is maintained in an active state at the selected location for a period of time sufficient to permit the adjacent soil around the borehole to become molten. The molten soil is then allowed to solidify into a mass of solid material which substantially occludes the borehole.

In some borehole sealing applications it has been found desirable to introduce oxygen rich substances into the borehole in a region that is substantially adjacent the activated energy probe. Additionally it has been found useful in some case to raise the energy probe 18 above the predetermined starting depth while maintaining the energy probe in an activated state. By controlling the rate of ascent of the probe to produce a molten state in the soil around the borehole, the borehole is effectively sealed along substantially its entire length.

It is to be appreciated and understood that the specific embodiments of the invention are merely illustrative of the general principles of the invention. Various modifications may be made by those skilled in the art which are consistent with the principles set forth. For example, the inventive technique can be employed to produce a barrier around a particularly troublesome underground structure such as a storage tank. Additionally, the inventive technique can be used to solidify a specific region of highly contaminated or radioactive soil, a so-called "hot spot". In this case, the treated and solidified "hot spot" can be removed in relatively few pieces without risk of spreading contaminated dust in the atmosphere or radiation exposure of remediation workers.

What is claimed is:

1. Apparatus for in situ treatment and oxidation of waste materials in contaminated soil comprising:

a movable energy probe capable of melting the contaminated soil;

means for introducing the energy probe into the contaminated soil to a predetermined depth;

means for activating the energy probe after the probe is inserted to the predetermined depth;

means for maintaining the energy probe at a predetermined location for a period of time sufficient to permit at least about one cubic foot of adjacent contaminated soil to become molten;

means for introducing oxygen rich substances to the molten soil; and means for controlling the amount of introduced oxygen to (a) preclude a reducing reaction between any carbon bearing components and any metallic components of the waste materials and to (b) produce metallic oxides from the metallic components which oxides dissolve into the molten waste material.

2. The apparatus of claim 1 which further comprises:

means for raising the energy probe above the predetermined starting depth while maintaining the energy probe in an activated state;

means for controlling the rate of ascent of the probe so that the contaminated soil which becomes adjacent to the probe during its ascent is melted and its organic and metallic components are oxidized; and wherein the rate of ascent is controlled to permit the energy probe to superheat the adjacent contaminated soil and thereby produce enhanced opportunity for formation of metallic oxide crystals within the contaminated soil during solidification thereof.

3. The apparatus of claim 1 which further comprises means for introducing waste form modifiers into the molten contaminated soil to produce a basaltic rock from the resolidified contaminated soil.

4. The apparatus of claim 1 which further comprises means for introducing neucleation sites into the molten contaminated soil to enhance crystal formation within the contaminated soil during re-solidification thereof.

5. The apparatus of claim 1 which further comprises means for venting oxides of organic components of the contaminated soil which are produced during heating of the contaminated soil by the energy probe.

6. The apparatus of claim 1 wherein the oxygen rich material is a gas with a nitrogen content less than about 20% by weight.

7. The apparatus of claim 1 wherein the oxygen rich material is a gas with an oxygen content greater than about 80% by weight.

8. The apparatus of claim 1 wherein the energy probe is initially activated at a level which at least about 17 feet below grade level.

9. A method for in situ treatment and oxidation of waste materials in contaminated soil comprising the steps of:

introducing an energy probe into the contaminated soil to a predetermined depth;

activating the energy probe after the probe is inserted to the predetermined depth to melt at least about one cubic foot of the soil;

introducing oxygen rich substances to the molten soil; and controlling the amount of introduced oxygen to (a) preclude a reducing reaction between any carbon bearing components and any metallic components of the waste materials and to (b) produce metallic oxides from the metallic components which oxides dissolve into the molten waste material.

10. The method of claim 9 which further comprises the steps of:

raising the energy probe above the predetermined starting depth while maintaining the energy probe in an activated state;

controlling the rate of ascent of the probe so that the contaminated soil which becomes adjacent to the probe during its ascent is melted and its organic and metallic components are oxidized; and wherein the rate of ascent is controlled to permit the energy probe to superheat the adjacent contaminated soil and thereby produce enhanced opportunity for formation of metallic oxide crystals within the contaminated soil during solidification thereof.

11. The method of claim 9 which comprises the further step of introducing waste form modifiers into the molten contaminated soil to produce a basaltic rock from the resolidified contaminated soil.

12. The method of claim 9 which comprises the further step of introducing neucleation sites into the molten contaminated soil to enhance crystal formation within the contaminated soil during re-solidification thereof.

13. The method of claim 9 which comprises the further step of venting oxides of organic components of the contaminated soil which are produced during heating of the contaminated soil by the energy probe.

14. The method of claim 9 wherein the oxygen rich material is a gas with a nitrogen content less than about 20% by weight.

15. The method of claim 9 wherein the oxygen rich material is a gas with a oxygen content greater than about 80% by weight.

16. The method of claim 9 wherein the energy probe is initially activated at a level which is below grade level.

17. The method of claim 9 wherein the energy probe is initially activated at a level which at least about 17 feet below grade level.

18. The method of claim 9 wherein oxides of titanium and zirconium are introduced in suitable quantities to produce IEB IV.

19. The method of claim 9 wherein compounds having a large neutron adsorption cross-section are introduced into the molten contaminated soil thereby reducing the probability of a sustained nuclear reaction from spontaneous decay and release of neutrons in contaminated soils containing nucleotides.

* * * * *